(12) United States Patent
Amador et al.

(10) Patent No.: US 10,352,456 B2
(45) Date of Patent: Jul. 16, 2019

(54) AXIAL SCOOP SEAL PLATE

(71) Applicant: United Technologies Corporation, Hartford, CT (US)

(72) Inventors: Armando Amador, Wethersfield, CT (US); Russell B. Witlicki, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 439 days.

(21) Appl. No.: 15/034,756

(22) PCT Filed: Aug. 13, 2014

(86) PCT No.: PCT/US2014/050870
§ 371 (c)(1),
(2) Date: May 5, 2016

(87) PCT Pub. No.: WO2015/069348
PCT Pub. Date: May 14, 2015

(65) Prior Publication Data
US 2016/0273657 A1 Sep. 22, 2016

Related U.S. Application Data

(60) Provisional application No. 61/900,779, filed on Nov. 6, 2013.

(51) Int. Cl.
*F16J 15/34* (2006.01)

(52) U.S. Cl.
CPC .................... *F16J 15/342* (2013.01)

(58) Field of Classification Search
CPC .......... F16J 15/44; F16J 15/447; F16J 15/164; F16J 15/40; F16J 15/34; F16J 15/341;
(Continued)

(56) References Cited

U.S. PATENT DOCUMENTS 2,990,202 A * 6/1961 Dennison .............. F01D 11/003
277/399
3,572,727 A * 3/1971 Greiner .................. F16J 15/342
277/385
(Continued)

FOREIGN PATENT DOCUMENTS

EP 1496294 A1 1/2005
EP 2412938 A2 2/2012

OTHER PUBLICATIONS

Supplementary European Search Report for EP Application No. EP 14 85 9502.

*Primary Examiner* — Vishal A Patel
(74) *Attorney, Agent, or Firm* — Cantor Colburn LLP (57) ABSTRACT

An annular seal plate for a shaft assembly in which the seal plate is disposed between and abuts a first adjacent element that rotates with the shaft and seal plate and a second adjacent element that does not rotate with the shaft. The annular seal plate includes an axial scoop defining an annular lubricant collection area disposed radially outwardly from an oil supply orifice that is in fluid communication with a source of pressurized lubricant supplied through the first adjacent element. Lubricant flows through the oil supply orifice and collects in the collection area. An oil passage places the collection area in fluid communication with a lateral surface facing and abutting the second adjacent element to provide lubricant to the interface between the annular seal plate and the second adjacent element.

13 Claims, 4 Drawing Sheets

(58) Field of Classification Search
CPC ........ F01D 25/18; F01D 25/00; F01D 25/162; F01D 11/00
See application file for complete search history.

(56) References Cited

U.S. PATENT DOCUMENTS

| | | | | |
|---|---|---|---|---|
| 3,578,343 | A | * | 5/1971 | Taschenberg ...... B62D 55/0887 277/399 |
| 4,406,459 | A | * | 9/1983 | Davis ................. F16J 15/3404 277/401 |
| 4,406,460 | A | * | 9/1983 | Slayton ................ F16J 15/164 277/401 |
| 4,928,978 | A | * | 5/1990 | Shaffer ................ F01D 25/183 277/401 |
| 4,990,054 | A | * | 2/1991 | Janocko ................ F04D 9/001 277/401 |
| 5,052,694 | A | * | 10/1991 | Lipschitz ............... F16J 15/342 277/388 |
| 5,464,227 | A | * | 11/1995 | Olson ................. F16J 15/3404 277/400 |
| 5,622,438 | A | * | 4/1997 | Walsh ................. F01D 25/162 277/635 |
| 5,636,848 | A | * | 6/1997 | Hager ................... F16J 15/164 277/420 |
| 6,109,617 | A | | 8/2000 | Laney |
| 2008/0066444 | A1 | | 3/2008 | Cornelius et al. |
| 2010/0264601 | A1 | | 10/2010 | Craig et al. |

* cited by examiner

AXIAL SCOOP SEAL PLATE

TECHNICAL FIELD

This disclosure relates generally to seal plates through which oil passes to lubricate an interface between the seal plate and an element rotating relative to the seal plate, and in particular to a seal plate having an axial scoop defining a lubrication collection area for even distribution of lubricant across the interface.

BACKGROUND

In rotating shaft arrangements used in, for example, gas turbine engines, components, such as bearing races, radial scoops and seal plates, rotate with the shaft. Other elements of the arrangement, or adjacent elements, may abut the attached components but remain stationary as the shaft and attached components rotate, or may rotate at a different speed or in the opposite direction. The relative movement between the abutting elements causes friction at the interface between the elements. To reduce friction and to extend the useful life of the elements, lubricant, such as oil or grease, as provided at the interface.

Figure 1:
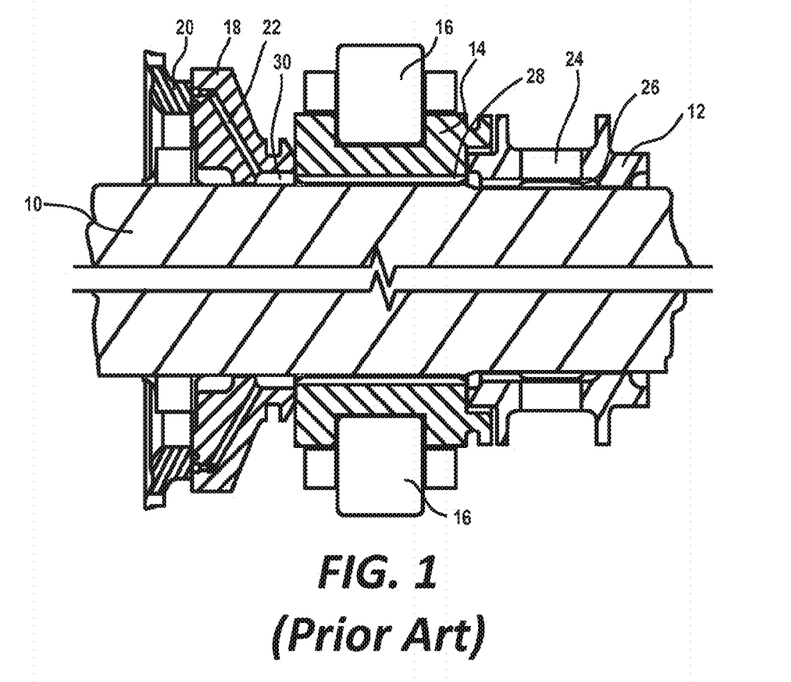
FIG. 1 is a cross-sectional view of a shaft arrangement having a previously known seal plate.

FIG. 1 illustrates one example of a shaft arrangement where oil is provided to such an interface. A shaft 10 rotates under the force of a power transmission mechanism (not shown). Among other elements, the shaft 10 may have a radial scoop 12, a bearing inner race 14 for bearings 16, such as roller, ball or tapered bearings or the like, and a seal plate 18 mounted thereon for rotation with the shaft 10. A carbon element 20 is disposed about the shaft 10 but does not rotate with the shaft 10. The carbon element 20 abuts the seal plate 18 on a surface opposite the inner race 14. Lubricant is provided to the interface between the seal plate 18 and the carbon element 20 via a machined oil passage 22 through the seal plate 18. Pressurized oil is provided at the radial scoop 12 and flows through a plurality of circumferentially spaced openings 24 to slots 26 in an inner surface of the radial scoop 12. The slots 26 are in fluid communication with slots 28 in an inner surface of the inner race 14 extending from the radial scoop 12 to the seal plate 18. Slots 30 on an inner surface of the seal plate 18 connect the slots 28 to the inner race 14 to provide oil to the machined oil passage 22 and, correspondingly, to the interface between the seal plate 18 and the carbon element 20.

The prior art arrangement provides lubrication to the interface, but opportunities exist for improving the presently known configurations. For example, high stresses may be experienced in the machined oil passages 22 in the seal plate 18. The high stresses are attributed at least in part to high rotor speeds that are manifested within the machined oil passages 22 and result from the overall machined hole length and manufacturing limitations in hole size and surface texture control. In addition, the number of slots 28 in the inner race 14 varies, and the slots 28 may not always have a one-to-one correspondence with the slots 30 and machined oil passages 22 of the seal plate 18. This can lead to an uneven distribution of oil across the interface, with oil-rich areas where the slots 28, 30 align and oil lean areas where the slots 28, 30 do not align.

In view of the foregoing, a need exists for an improved arrangement wherein stresses in the machined oil passages are reduced and distribution of lubricant across the interface between the seal plate and the adjacent element is more uniform.

SUMMARY OF THE DISCLOSURE

In one aspect of the present disclosure, an annular seal plate for rotating on a shaft is disclosed. The annular seal plate includes an annular inner surface that receives the shaft, an oil inlet lateral surface, an oil outlet lateral surface axially opposing the oil inlet lateral surface, an oil supply orifice in fluid communication with the oil inlet lateral surface, an axial scoop disposed radially outwardly from the oil supply orifice and defining an annular oil collection area placed in fluid communication with the oil inlet lateral surface by the oil supply orifice, and an oil passage extending through the seal plate and placing the oil collection area in fluid communication with the oil outlet. Lubricant at the oil inlet lateral surface flows through the oil supply orifice, collects in the annular oil collection area, and subsequently flows through the oil passage to the oil outlet lateral surface when the seal plate rotates with the shaft.

In another aspect of the present disclosure, an annular seal plate for a shaft assembly is disclosed. The shaft assembly may include a shaft upon which the annular seal plate is disposed for rotation there with, a first adjacent element disposed on the shaft for rotation there with and having a first element oil supply slot through a first element lateral surface, and a second adjacent element disposed about the shaft and not rotating with the shaft so that the annular seal plate rotates relative to the second adjacent element. The annular seal plate includes an annular inner section having an inner section inner surface dimensioned to receive the shaft, an inner section outer surface, an oil inlet lateral surface, an oil outlet lateral surface axially opposite the oil inlet lateral surface, an inner section axial length, and an oil supply orifice extending through the annular inner section from the inner section inner surface to the inner section outer surface and placing the oil inlet lateral surface in fluid communication with the inner section outer surface. The annular seal plate also includes an annular body section extending outwardly from the inner section outer surface and having an end defined by the oil outlet lateral surface, an oppositely disposed body section lateral surface, a body section axial length that is less than the inner section axial length, and an oil passage extending through the annular body section from a body section lateral surface to the oil outlet lateral surface and placing the body section lateral surface in fluid communication with the oil outlet lateral surface. The annular seal plate further includes an annular axial scoop extending axially from the body section lateral surface, wherein the annular axial scoop is disposed radially outwardly from the oil supply orifice and combines with a corresponding portion of the body section lateral surface through which the oil passage extends to define an annular oil collection area. When the seal plate, the first adjacent element and the second adjacent element are assembled on the shaft with the oil inlet lateral surface facing and engaging the first element lateral surface and the oil outlet lateral surface facing and engaging the second element lateral surface, and when the shaft, the first adjacent element and the annular seal plate rotate, lubricant from the first element oil supply slot flows through the oil supply orifice and collects in the annular oil collection area, and subsequently flows from the annular oil collection area through the oil passage to the oil outlet lateral surface.

In a further aspect of the present disclosure, a method for providing lubricant between facing and engaging surfaces in a shaft assembly in disclosed. The shaft assembly may include a shaft, an annular seal plate having a seal plate inner surface facing and engaging the shaft, an oil inlet lateral surface, an oil outlet lateral surface, and an annular lubricant collection area. The shaft assembly further includes a first adjacent element disposed on the shaft for rotation therewith and having a first element oil supply slot through a first element lateral surface that faces and engages the oil inlet lateral surface, and a second adjacent element disposed about the shaft and not rotating with the shaft so that the annular seal plate rotates relative to the second adjacent element and having a second element lateral surface facing and engaging the oil outlet lateral surface. The method for providing lubricant includes providing lubricant from the first element oil supply slot through an oil supply orifice of the annular seal plate that places the first element oil supply slot in fluid communication with the annular lubricant collection area, collecting the lubricant from the first element oil supply slot in the annular lubricant collection area of the annular seal plate, and delivering the lubricant collected in the annular lubricant collection area to the facing and engaging oil outlet lateral surface and the second element lateral surface through an oil passage extending through the annular seal plate from the annular lubricant collection area to the oil outlet lateral surface.

Additional aspects are defined by the claims of this patent.

BRIEF DESCRIPTION OF THE DRAWINGS

The following list of accompanying figures support the detailed description of the embodiments, below, are not intended to limit the scope of the disclosed embodiments, and wherein, for the sake of clarity, like reference numerals are used for like components.

DETAILED DESCRIPTION

Figure 2:
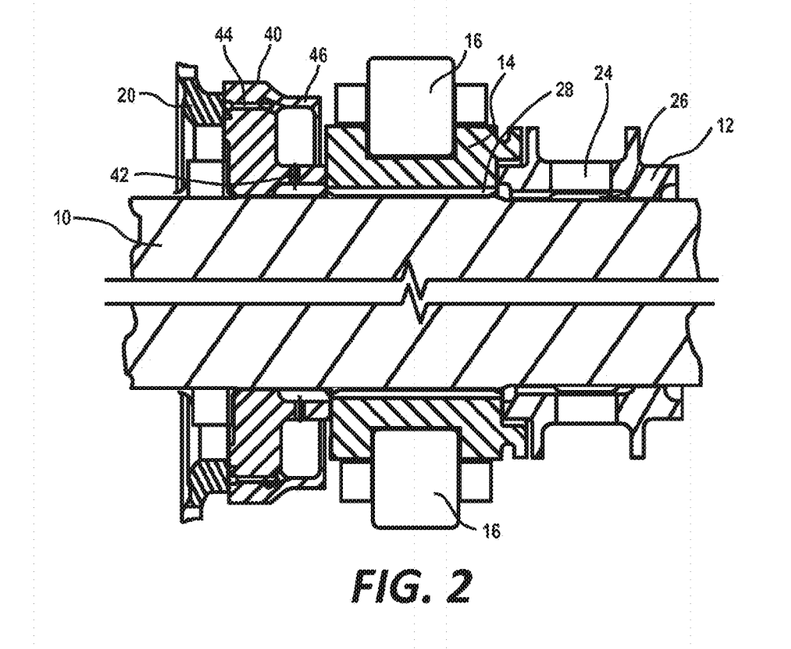
FIG. 2 is a cross-sectional view of the shaft arrangement of FIG. 1 having a seal plate with an axial scoop in accordance with the present disclosure.

FIG. 2 illustrates the shaft arrangement of FIG. 1 with a seal plate 40 substituted for the previously known seal plate 18. The seal plate 40 has a generally annular configuration and is positioned on the shaft 10 between a first adjacent element, i.e. the inner race 14, and a second adjacent element, i.e. the abutting carbon element 20. In contrast to the seal plate 18, the seal plate 40 does not have a continuous machined oil passage from the slot 28 of the inner race 14 to the carbon element 20. Instead, the seal plate 40 includes an oil supply orifice 42 delivering oil from the inner race 14, and a separate machined oil passage 44 that is shorter than the machined oil passage 22 of the seal plate 18. Oil from the oil supply orifice 42 collects in an axial scoop 46 positioned radially outwardly from the oil supply orifice 42 before flowing through the machined oil passage 44 as will be discussed more fully below.

Figure 3:
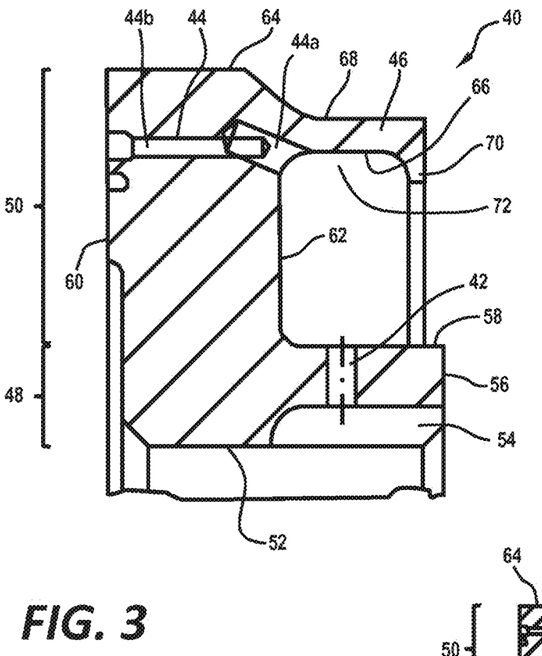
FIG. 3 is an enlarged cross-sectional view of the seal plate of FIG. 2.

The cross-section of the seal plate 40 is shown in greater detail in FIG. 3. The seal plate 40 may include an annular inner section 48 that is disposed proximate the shaft 10 when assembled, and an annular body section 50 extending radially outwardly from the inner section 48, and the axial scoop 46 extending axially from the body section 50 over a portion of the inner section 48 that includes the oil supply orifice 42. The inner section 48 has an inner surface 52 having an inner section inner diameter that is approximately equal to a shaft outer diameter of the shaft 10 to allow the seal plate 40 to be press fit onto the shaft 10, or slid onto the shaft 10 and secured for rotation therewith by a key (not shown) or other securement structure. The inner section 48 may further include a plurality of oil supply slots 54 defined in and circumferentially spaced about the inner surface 52 and extending inwardly from an oil inlet lateral surface 56 that will abut the inner race 14. At each oil supply slot 54, an oil supply orifice 42 may be machined through the inner section 48 to place the corresponding oil supply slot 54 in fluid communication with an inner section outer surface 58 that has an inner section outer diameter. The oil supply orifice 42 is illustrated as extending radially between the oil supply slot 54 and the inner section outer surface 58, but could be angled relative to a radial line from a longitudinal axis of the shaft 10 and the seal plate 40 as necessary for proper distribution of the lubricant.

Figure 4:
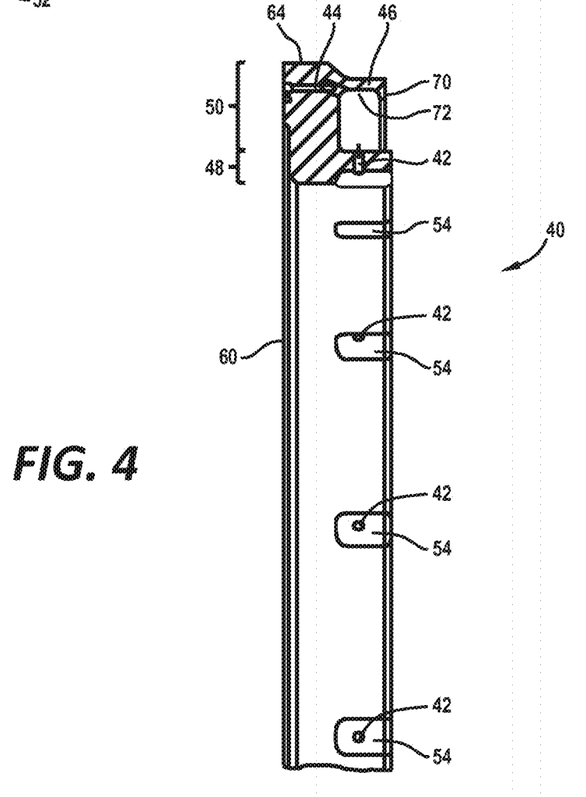
FIG. 4 is a partial cross-sectional view of the seal plate of FIG. 2 illustrating a portion of an inner surface of the seal plate.
Figure 5:
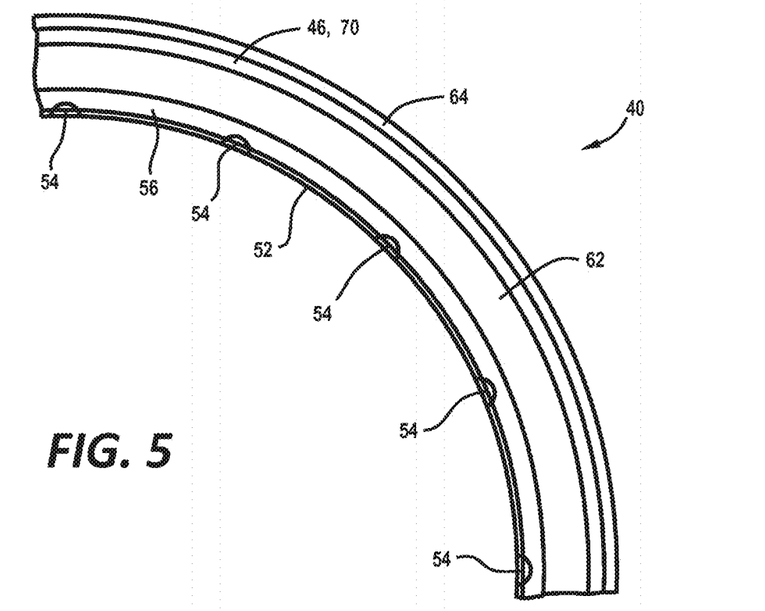
FIG. 5 is a side view of a portion of the seal plate of FIG. 2 illustrating an oil inlet lateral surface of the seal plate.

The spacing of the oil supply slots 54 and corresponding oil supply orifices 42 is illustrated more fully in the partial cross-sectional view of FIG. 4 and the partial side view of FIG. 5. The oil supply slots 54 may have a one-to-one correspondence with corresponding slots 28 of the inner race 14. However, correspondence between the slots 28, 54 is not required as long as fluid communication exists between the pressurized lubricant source and the one or more oil supply orifices 42. In an alternative embodiment, the inner race 14 may have a continuous annular groove or recess proximate the surface that abuts the seal plate 40. Similarly in another alternative embodiment, the oil supply slots 54 may be replaced by a continuous annular groove or recess defined in the inner surface 52 that is intersected by the oil supply orifices 42. In these embodiments, a particular alignment of the seal plate 40 relative to the slots 28 of the inner race 14 is not required.

Figure 6:
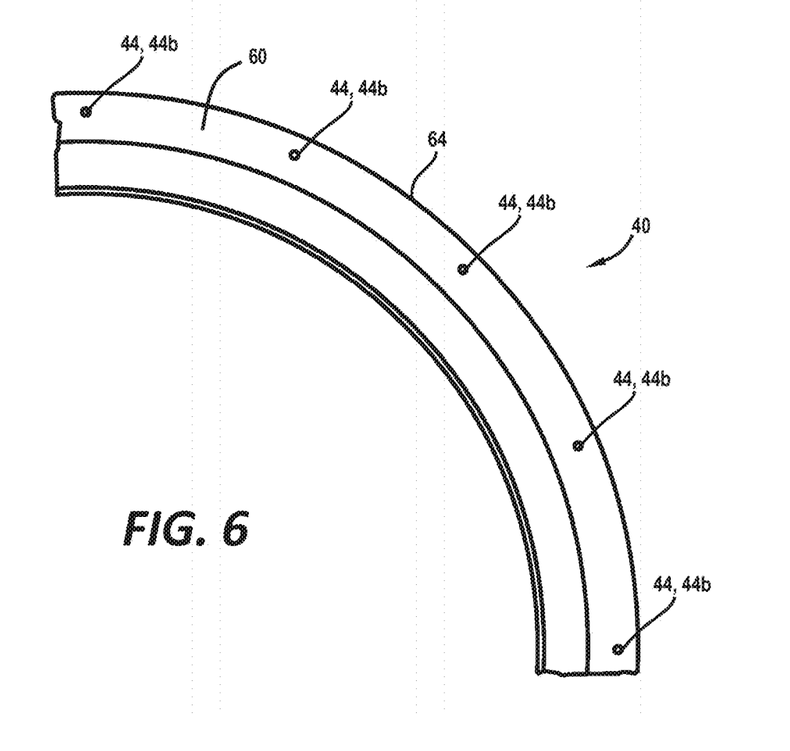
FIG. 6 is a side view of a portion of the seal plate of FIG. 2 illustrating an oil outlet lateral surface of the seal plate.

Returning to FIG. 3, the body section 50 of the seal plate 40 extends radially outwardly from the inner section 48 opposite the oil inlet lateral surface 56. The body section 50 has a width that is less than the width of the inner section 48 so that the oil supply orifices 42 are unobstructed. The inner section 48 and the body section 50 may share a common oil outlet lateral surface 60 that is axially opposite the oil inlet lateral surface 56 on the seal plate 40, and the body section 50 may include an oppositely disposed body section lateral surface 62 extending outwardly from the inner section outer surface. A plurality of the machined oil passages 44 may be circumferentially spaced about the body section 50 proximate a body section outer surface 64 and extend from the body section lateral surface 62 to the oil outlet lateral surface 60. The plurality of machined oil passages 44 may correspond to the plurality of oil supply orifices 42 in number, circumferential spacing and radial alignment in the embodiments illustrated in FIGS. 3 and 6. However, more or fewer machined oil passages 44 may be provided in positioned about the body section 50 as necessary to provide sufficient lubricant to the oil outlet lateral surface 60.

Each machined oil passage 44 may be formed by a single machining operation extending from the oil outlet lateral surface 60 to the body section lateral surface 62. Alternatively, as shown in FIG. 3, the machined oil passages 44 may be formed by two coordinated machining operations. A first machining operation may form an inlet portion 44a of the machined oil passage 44 extending into the body section 50 from the body section lateral surface 62. A second machining operation may form an outlet portion 44b extending into the body section 50 from the oil outlet lateral surface 60 and intersecting the inlet portion 44a to place the lateral surfaces 60, 62 in fluid communication.

The axial scoop 46 extends axially from the body section lateral surface 62 to a position wherein the axial scoop 46 is radially outwardly disposed relative to the oil supply orifices 42. The axial scoop 46 is annular and has an axial scoop inner surface 66 and an axial scoop outer surface 68. The axial scoop 46 is proximate the base section outer surface 64 with the axial scoop inner surface 66 intersecting the machined oil passages 44. The axial scoop 46 further includes an axial scoop lip 70 extending radially inwardly from the axial scoop inner surface 66 so that the lip 70, the axial scoop inner surface 66 and a corresponding portion of the body section lateral surface 62 form an annular oil collection area 72 radially outwardly from the oil supply orifices 42. The depth of the lip 70 may be sufficient so that the depth of the oil collection area 72 may completely cover the openings of the machined oil passages 44. In the illustrated embodiment, the axial scoop 46 and the lip 70 are integrally formed components of the seal plate 40. However, the various sections of the seal plate 40 may be formed separately and later assembled. For example, the lip 70 may be formed separately from an annular structure such as a retaining ring. An annular groove may be formed in the axial scoop inner surface 66 proximate the location of the lip 70, and a retaining ring may be installed into the groove after the inlet portion 44a of the oil passages 44 are machined. Such an arrangement may allow for the lip 70 to extend further inwardly and form a deeper oil collection area 72 without obstructing the machining process for the inlet portions 44a of the machined oil passages 44.

Figure 7:
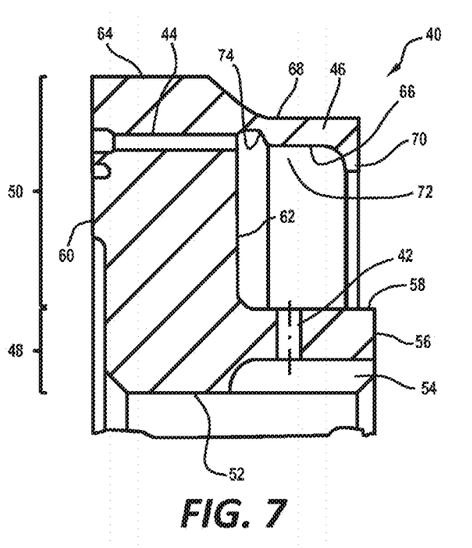
FIG. 7 is an enlarged cross-sectional view of an alternate embodiment of the seal the seal plate of FIG. 2.

FIG. 7 illustrates an alternative embodiment that may further reduce the stresses in the seal plate 40 by eliminating potential high stresses at the point of intersection of the inlet portions 44a and the outlet portions 44b of the machined oil passages 44. In the illustrated embodiment, the machined oil passages 44 may be formed by a single machining operation through the oil outlet lateral surface 60. The machined oil passages 44 may directly intersect the body section lateral surface 62, or may intersect an annular recess 74 at the intersection of the body section lateral surface 62 and the axial scoop inner surface 66 to allow the lubricant to flow out of the oil collection area 72 and through the machined oil passages 44.

Figure 8:
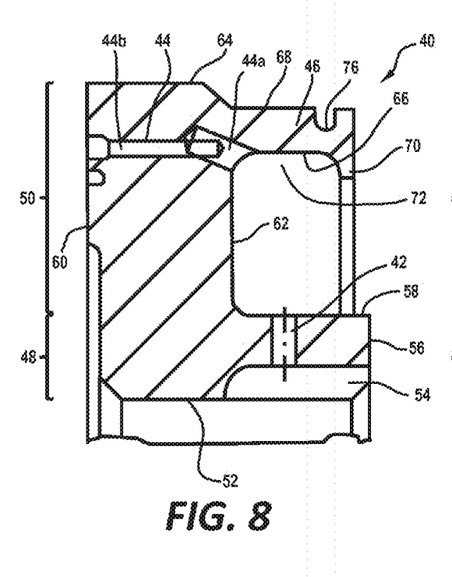
FIG. 8 is an enlarged cross-sectional view of another alternative embodiment of the seal plate of FIG. 2.
Figure 9:
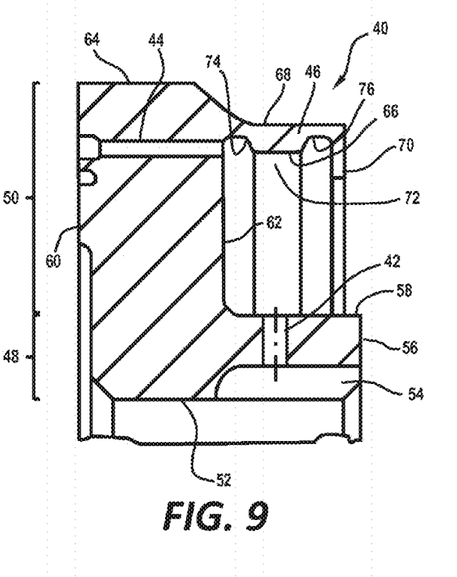
FIG. 9 is an enlarged cross-sectional view of an alternative embodiment of the seal plate of FIG. 7.

As mentioned previously, the seal plate 40 may be installed onto the shaft 10, possibly by press fitting. The axial scoop lip 70 may be able to function as a puller surface that may be engaged by a tool used to pull the seal plate 40 off of the shaft 10. In further alternative embodiments of the seal plate 40 shown in FIGS. 8 and 9, an annular pull surface 76 may be provided to receive a corresponding tool (not shown) used to pull the seal plate 40 off of the shaft 10. In the embodiment of FIG. 8, the annular pull surface 76 may be defined in the axial scoop outer surface 68. In the further alternative embodiment of FIG. 9, the annular puller recess 76 may be defined in the axial scoop inner surface 66 proximate the axial scoop lip 70.

INDUSTRIAL APPLICABILITY

The seal plate 40 in accordance with the present disclosure may provide a uniform distribution of the lubricant across the interface between the seal plate 40 and the carbon element 20. Referring back to FIGS. 2 and 3, pressurized lubricant such as oil may be provided at the radial scoop 12, and pass through the openings 24 of the radial scoop 12 to the slots 26 proximate the shaft 10. The lubricant continues to flow through the slots 28 of the inner race 14 to the oil inlet lateral surface 56 of the seal plate 40. The lubricant then enters the oil supply slots 54 of the seal plate 40 and passes through the corresponding oil supply orifices 42. The centrifugal force created by the rotation of the shaft 10 and the seal plate 40 causes the lubricant from the oil supply orifices 42 to collect within the oil collection area 72 defined by the axial scoop inner surface 66, the lip 70 and the body section lateral surface 62. The centrifugal force further causes the lubricant to distribute uniformly about the seal plate 40 so that each machined oil passage 44 has a similar amount of lubricant available for communication through the machined oil passage 44. As the rotation of the seal plate 40 continues, the lubricant passes through the machined oil passages 44 to the oil outlet lateral surface 60 where the lubricant coats the lateral surface 60 and a facing and engaging surface of the carbon element 20 to reduce friction and wear between the components.

The seal plate 40 as disclosed herein addresses the length of the machined oil passage, difficulties in machining the passages and stress concentrations within the seal plate by effectively reducing the overall length of the machined oil passages 44 and simplifying the manufacturing of the seal plate 40. Instead of collecting oil at the inner diameter of the seal plate and delivering the oil to the intended location via lengthy machined oil passages, the seal plate 40 uses the oil supply orifices 42 at the inner section inner surface 52 to direct the lubricant to the axial scoop 46 and oil collection area 72. The axial scoop 46 then collects the oil, distributes the oil uniformly throughout the oil collection area 72, and distributes the oil evenly to the shorter machined oil passages 44. The shorter drilled hole depths of the inlet portion 44a and the outlet portion 44b are significantly easier to machine than the significantly longer oil passages 22 of the seal plate 18. By removing significantly less material from the seal plate 40, the durability of the component is increased and the stresses on the seal plate 40 are reduced.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

What is claimed is:

1. An annular seal plate for rotating on a shaft, the annular seal plate comprising:
   an annular inner surface that receives the shaft;
   an oil inlet lateral surface;
   an oil outlet lateral surface axially opposing the oil inlet lateral surface;
   an oil supply orifice located in an annular inner section of the seal place, the oil supply orifice being in fluid communication with the oil inlet lateral surface;
   an axial scoop spaced radially outwardly from the oil supply orifice and the annular inner section, the axial scoop defining an annular oil collection area that is in a facing spaced relationship with respect to the annular inner section of the seal plate, the annular oil collection are being in fluid communication with the oil inlet lateral surface via the oil supply orifice; and
   an oil passage extending through the seal plate and placing the oil collection area in fluid communication with the oil outlet lateral surface;
   wherein the axial scoop includes an annular lip extending radially inwardly toward the annular inner section and defines a lateral boundary of the annular oil collection area opposite the oil passage, the annular lip having a distal end that is in a facing spaced relationship with respect to the annular inner section such that a laterally open gap is provided between the distal end of the annular lip and the annular inner section; and
   wherein lubricant at the oil inlet lateral surface flows through the oil supply orifice, collects in the annular oil collection area, and subsequently flows through the oil passage to the oil outlet lateral surface when the seal plate rotates with the shaft.

2. A shaft assembly comprising:
   an annular seal plate according to claim 1;
   a shaft;
   a first element capable of rotating with the shaft and having a first lateral surface and an oil supply slot therethrough, and a second element not rotating with the shaft, and wherein lubricant from the first element oil supply slot is capable of flowing through the oil supply orifice when the seal plate, the first element and the second element are assembled on the shaft with the oil inlet lateral surface facing and engaging the first lateral surface and the oil outlet lateral surface facing and engaging the second lateral surface, and the shaft rotates.

3. The shaft assembly claim 2, wherein the seal plate inner surface defines a seal plate oil supply slot extending axially inwardly from the oil inlet lateral surface and intersecting the oil supply orifice to place the oil supply orifice in fluid communication with the first element oil supply slot.

4. The shaft assembly according to claim 2, wherein the first element has a plurality of circumferentially spaced first element oil supply slots, and wherein the oil supply orifice of the annular seal plate comprises a plurality of circumferentially spaced oil supply orifices, with each of the plurality of circumferentially spaced oil supply orifices corresponding to one of the plurality of circumferentially spaced first element oil supply slots and placing the corresponding one of the plurality of circumferentially spaced first element oil supply slots in fluid communication with the annular oil collection area.

5. The according to claim 1, comprising:
   a plurality of oil supply orifices circumferentially spaced about the annular seal plate; and
   a plurality of oil passages circumferentially spaced about the annular seal plate.

6. The annular seal plate according to claim 5, wherein each of the plurality of circumferentially spaced oil supply orifices corresponds to one of the plurality of oil passages and is radially aligned with the corresponding one of the plurality of oil passages.

7. The annular seal plate according to claim 1, wherein the oil passage comprises an inlet portion extending inwardly from the annular oil collection area and an outlet portion extending inwardly from the oil outlet lateral surface and intersecting the inlet portion.

8. A gas turbine engine, comprising:
   a shaft assembly; and
   the annular seal plate of claim 1, the shaft assembly including a first element capable of rotating with the shaft and having a first lateral surface and an oil supply slot there through, and a second element not rotating with the shaft, and wherein lubricant from the first element oil supply slot is capable of flowing through the oil supply orifice when the seal plate, the first element and the second element are assembled on the shaft with the oil inlet lateral surface facing and engaging the first lateral surface and the oil outlet lateral surface facing and engaging the second lateral surface, and the shaft rotates.

9. The annular seal plate according to claim 6, where a number of the plurality of oil supply orifices is different than a number of the plurality of oil passages.

10. A method for providing lubricant between facing and engaging surfaces in a shaft assembly that includes a shaft, an annular seal plate having a seal plate inner surface facing and engaging the shaft, an oil inlet lateral surface axially opposing the oil inlet lateral surface, an oil outlet lateral surface, and an annular lubricant collection area, wherein the shaft assembly further includes a first adjacent element disposed on the shaft for rotation there with and having a first element oil supply slot through a first element lateral surface that faces and engages the oil inlet lateral surface, and a second adjacent element disposed about the shaft and not rotating with the shaft so that the annular seal plate rotates relative to the second adjacent element and having a second element lateral surface facing and engaging the oil outlet lateral surface, the method for providing lubricant comprising:
   providing lubricant from the first element oil supply slot through an oil supply orifice of the annular seal plate that places the first element oil supply slot in fluid communication with the annular lubricant collection area, wherein the oil supply orifice is located in an inner annular section of the seal plate;
   collecting the lubricant from the first element oil supply slot in the annular lubricant collection area of the annular seal plate, wherein an axial scoop defines the annular lubricant collection area and the axial scoop is spaced radially from the oil supply orifice and the annular inner section, the annular oil collection area being in a facing spaced relationship with respect to the annular inner section of the seal plate, the annular oil collection area being in fluid communication with the oil inlet lateral surface via the oil supply orifice, wherein the axial scoop includes an annular lip extending radially inwardly toward the annular inner section and defines a lateral boundary of the annular oil collection area opposite the oil passage, the annular lip having a distal end that is in facing spaced relationship with respect to the annular inner section such that a laterally open gap is provide between the distal end of the annular lip and the annular inner section; and delivering the lubricant collected in the annular lubricant collection area to the facing and engaging oil outlet lateral surface and the second element lateral surface through an oil passage extending through the annular seal plate from the annular lubricant collection area to the oil outlet lateral surface.

11. The method for providing lubricant according to claim 10, wherein the seal plate inner surface defines a seal plate oil supply slot extending axially inwardly from the oil inlet lateral surface and intersecting the oil supply orifice to place the oil supply orifice in fluid communication with the first element oil supply slot, the method for providing lubricant comprising providing the lubricant from the first element oil supply slot through the seal plate oil supply slot to the oil supply orifice.

12. The method for providing lubricant according to claim 10, wherein the first adjacent element has a plurality of circumferentially spaced first element oil supply slots, and wherein the annular seal plate has a plurality of circumferentially spaced oil supply orifices, with each of the plurality of circumferentially spaced oil supply orifices corresponding to one of the plurality of circumferentially spaced first element oil supply slots and placing the corresponding one of the plurality of circumferentially spaced first element oil supply slots in fluid communication with the annular lubricant collection area, the method for providing lubricant comprising providing the lubricant from each of the plurality of circumferentially spaced first element oil supply slots through the corresponding one of the plurality of circumferentially spaced oil supply orifices that places the one of the plurality of circumferentially spaced first element oil supply slots in fluid communication with the annular lubricant collection area.

13. The method for providing lubricant according to claim 10, wherein the annular seal plate includes a plurality of oil passages extending through the annular seal plate from the annular lubricant collection area to the oil outlet lateral surface, the method for providing lubricant comprising delivering the lubricant collected the annular lubricant collection area to the facing and engaging oil outlet lateral surface and the second element lateral surface through the plurality of oil passages.

* * * * *